US008833391B2

(12) United States Patent
Andersson

(10) Patent No.: US 8,833,391 B2
(45) Date of Patent: Sep. 16, 2014

(54) VALVE ARRANGEMENT

(75) Inventor: Bo Andersson, Jonkoping (SE)

(73) Assignee: Parker-Hannifin Corporation, Cleveland, OH (US)

( * ) Notice: Subject to any disclaimer, the term of this patent is extended or adjusted under 35 U.S.C. 154(b) by 968 days.

(21) Appl. No.: 11/842,336

(22) Filed: Aug. 21, 2007

(65) Prior Publication Data

US 2008/0054203 A1 Mar. 6, 2008

(30) Foreign Application Priority Data

Sep. 1, 2006 (EP) .................................... 06120006

(51) Int. Cl.
*F16K 31/12* (2006.01)
*F15B 11/02* (2006.01)
*F15B 13/01* (2006.01)

(52) U.S. Cl.
CPC .................................... *F15B 13/01* (2013.01)
USPC .................... 137/596.14; 251/29; 251/30.03; 251/43; 251/44; 91/447

(58) Field of Classification Search
USPC ............ 137/596.14, 596.17, 596.18, 115.19, 137/115.23, 596.15, 625.6, 625.61, 625.62, 137/625.63, 625.64; 251/30.02, 30.03, 29, 251/26, 33, 43, 44; 91/447, 453, 461
See application file for complete search history.

(56) References Cited

U.S. PATENT DOCUMENTS 2,403,391 A * 7/1946 Muir .............................. 91/441
2,480,712 A * 8/1949 Carbon ........................... 251/44
3,464,444 A * 9/1969 Tennis .................... 137/596.18
3,843,205 A * 10/1974 Shore ...................... 137/596.18
3,862,738 A * 1/1975 Stumpmeier .................. 251/44
3,981,478 A 9/1976 Lundsgart
4,149,565 A * 4/1979 Jennings et al. ............... 251/44
4,779,836 A 10/1988 Marklund
4,945,723 A * 8/1990 Izumi et al. ..................... 60/426
4,955,283 A 9/1990 Hidaka et al.
5,005,358 A * 4/1991 Hirata et al. .................... 60/426
5,137,254 A * 8/1992 Aardema et al. ............... 251/44
5,220,862 A * 6/1993 Schexnayder ................. 91/436
5,280,807 A * 1/1994 Frey et al. ............... 137/596.15
5,287,794 A * 2/1994 Andersson ...................... 91/436
5,558,004 A * 9/1996 Stellwagen ..................... 91/447
6,241,212 B1 * 6/2001 Takahashi et al. ............. 251/44
6,422,127 B1 * 7/2002 Huber et al. .................... 91/452
6,701,822 B2 * 3/2004 Hajek et al. ..................... 91/178
7,213,502 B2 * 5/2007 Vonderwell ..................... 91/454
8,118,113 B2 * 2/2012 Wrede et al. ............ 137/596.18
8,424,836 B2 * 4/2013 Ma et al. ......................... 251/43
2004/0099828 A1 * 5/2004 Krenzer et al. ................ 251/29

FOREIGN PATENT DOCUMENTS

DE 39 18119 A1 12/1990
EP 0 778 419 A2 6/1997
JP 58 005502 A 1/1983

* cited by examiner

*Primary Examiner* — Craig Schneider
*Assistant Examiner* — Craig J Price
(74) *Attorney, Agent, or Firm* — Renner, Otto, Boisselle & Sklar, LLP

(57) ABSTRACT

A valve arrangement is provided for selectively connecting a source of fluid pressure to a consumer in order to actuate the consumer in a predetermined direction. The valve arrangement utilizes a valve cone arranged in the valve body which connects the valve ports with each other when the valve cone is in its open position, and is actuated by a holding force which is greater than the force acting on the pressurized fluid side of the valve cone and dependent on the medium pressure in the input port.

9 Claims, 4 Drawing Sheets

VALVE ARRANGEMENT

CROSS REFERENCE TO RELATED APPLICATIONS

The present application claims the benefit of the filing date of EPO Patent Application No. 06120006.9, filed Sep. 1, 2006 the disclosure of which is incorporated herein by reference.

TECHNICAL FIELD

The invention relates to a valve arrangement for controlling a fluid consumer, which valve arrangement is arranged for selectively connecting a source of fluid pressure to the consumer in order to provide a fail-safe actuation of the consumer in a predetermined direction.

BACKGROUND ART

In fluid systems, actuators such as hydraulic cylinders or motors are often controlled using directional valves. FIG. 1 shows a conventional system of this type. The directional valve shown in this figure is a spool valve 11 that can be mechanically or electrically actuated to supply fluid from a pump 12 to one chamber of a cylinder 13 and drain fluid from a second chamber to a tank, or reservoir 14. In the subsequent text, the term "tank" is used to indicate a container or reservoir where oil is collected for reuse. In order to avoid flow in the wrong direction, in this case from the cylinder 13 to the pump 12, a non-return valve 15 is provided in the conduit supplying fluid to the cylinder. The non-return valve may comprise a ball or a cone held in contact with a seat by a resilient spring. This type of non-return valve is very robust and is generally considered to be fail-safe in a fluid system to prevent fluid flow in a particular direction.

A conventional valve controlled system of the above type suffers from energy losses caused by, for instance, a pressure drop across different valve components and the fact that pressurized fluid is drained to a tank. In order to control an actuator under load in a more energy efficient way, a valve arrangement may be provided with separate controllable valves, as shown in FIG. 2. In this figure the single directional valve has been replaced by four separate 2-port valves 21*a*-21*d*.

FIG. 2 shows a schematic representation of a valve arrangement for controlling the boom of a crane. The 2-port valves 21*a*-21*d* are electrically operated valves controlled by a central processing unit, also termed a CPU. A first supply valve 21*b* is controlled to supply fluid from a controllable pump 22 to a first chamber of a cylinder 23 in order to raise or lower a crane arm C. A first drain valve 21*d* is controlled to drain fluid from a second chamber of the cylinder 23 to a tank 24 as the crane arm C is being raised. A second supply valve 21*c* is controlled to supply fluid from the controllable pump 22 to the second chamber of the cylinder 23 in order to lower a crane arm C. A second drain valve 21*a* is controlled to drain fluid from the first chamber of the cylinder 23 to a tank 24 as the crane arm C is being lowered. A back-pressure valve 25 is provided in the conduit connecting the valves 21*a*-21*d* to the tank 24. In order to minimize energy losses, the separate valves 21 *a*-21*d* are controlled by the CPU based on control signals from an operator and signals from a number of pressure sensors 26, 27, 28 indicating the fluid pressure in various parts of the system. The control and sensor input signals allow the CPU to continuously calculate an optimized control strategy for controlling the pump and the valves.

Under certain load condition, an optimum control includes returning at least a part of the fluid flow to the pump, whereby the pump acts as a motor to recover energy that may be used in other parts of the system. Consequently the valves located between the pump and the cylinder ports must allow for flow control in both directions.

In order to minimize pressure losses during, for instance, a lifting movement the pressure drop over each valve must be relatively low. In many cases the pressure drop may be only a few percent of the absolute pressures. It is important that a system of this type is fail-safe. However, if one or more of the pressure sensors transmits an incorrect signal, indicating a pressure that is a few percent higher or lower than the actual pressure, a desired lifting movement may instead result in a sudden drop of a load carried by the crane arm. From a safety point of view, this is unacceptable. Even if redundant sensors are used it may be difficult to ensure that the system is fail safe, as the pressure delivered by the pump and the load on the cylinder can change rapidly. Consequently, a load being raised may suddenly begin to drop if an error has developed in the system.

An object of this invention is to provide a fail safe valve arrangement allowing control of the flow of fluid pressure medium in one direction or the other in a conduit with fluid pressure medium, which conduit may act as a supply as well as a return conduit between a pressure source and a consuming device. In addition, the valve arrangement should have a simple and reliable function avoiding the above problems.

DISCLOSURE OF INVENTION

The object of the invention is achieved by a valve arrangement according to the invention and a fluid circuit comprising such a valve arrangement, having the characteristic features defined in the appended claims.

This invention relates to a valve arrangement with a fail-safe function. According to one embodiment, a consumer supporting a load that is to be raised is connected to a fail-safe valve wherein an inlet valve port is only connected to an outlet valve port if the pressure supplied by a source of fluid pressure exceeds that in a chamber to be pressurized in the consumer. This prevents a supported load from being suddenly lowered by an inadvertent opening of the valve arrangement supplying fluid pressure.

The valve arrangement may be disposed in a conduit with fluid pressure medium, which conduit is used as supply conduit as well as return conduit. The fluid pressure conduit can be used for connecting a pressure source, such as a pump, with a pressure consuming device. The consumer may be a single- or double-acting cylinder or a piston-cylinder arrangement with a return stroke caused by a spring force or a similar suitable external or internal returning force. The fluid may be returned to a tank or through a reversible pump for regenerative purposes.

According to a preferred embodiment, the invention relates to a valve arrangement for controlling a fluid consumer, which valve arrangement is arranged for selectively connecting a source of fluid pressure to the consumer in order to actuate the consumer in a predetermined direction. The valve arrangement may comprise a pressure controlled valve comprising a first valve port connected to the source of fluid pressure and a second valve port connected to a first chamber of the consumer. Further, the valve arrangement may comprise a valve cone slidably movable in a cavity in a valve body, between a first position in which a connection between the first and second valve ports is closed by a first side of the valve cone, and a second position in which the connection between the first and second valve ports is open. The cone is being urged to its closed position by fluid pressure acting on an opposite, second side of the valve cone, which second side forms a space within the valve body. In addition the valve body may comprise means for passing fluid under pressure through the valve cone from the first and second valve ports to said space through passages each containing a non-return valve. Controllable valve means may be provided for connecting said space with the first and the second valve ports, respectively.

The controllable valve means may comprise a first pilot valve in a conduit connecting said space with the first valve port. This valve may be any suitable electrically operated valve, or a proportional magnet valve that is controlled steplessly between its two end positions. According to a preferred embodiment, each pilot valve is a solenoid actuated 2-port valve that is spring loaded towards a closed position. The first pilot valve is arranged to be actuated to allow a fluid flow from the second valve port to the first valve port, if the pressure in the second valve port exceeds that of the first valve port.

In addition, the controllable valve means may comprise a second pilot valve in a conduit connecting said space with the second valve port. The second pilot valve may be arranged to be actuated to allow a fluid flow from the first valve port to the second valve port, if the pressure in the first valve port exceeds that of the second valve port.

By using separate pilot valves in the conduits connecting said space with the first and second valve ports, the valve arrangement will be made fail-safe. Should the pressure in what is intended as an input port be lower than the pressure in the intended output port, the arrangement prevents the valve cone from opening. Consequently there will be no direct connection between the respective input and output ports until the input port pressure exceeds the output port pressure.

The invention also relates to a fluid circuit comprising a valve arrangement as described above. The fluid circuit may comprise a controllable source of fluid pressure, a fluid consumer having a first and a second chamber for fluid and which consumer is arranged to be movable between a first and a second end position under the action of said fluid. The fluid circuit is further provided with valve arrangements for selectively connecting the source of fluid pressure or a tank to the first or the second chamber of the consumer, in order to allow fluid to be supplied to or drained from the respective chamber. As described above, the valve arrangement for selectively connecting the source of fluid pressure to a first chamber of the consumer comprises a pressure controlled valve comprising a first valve port connected to the source of fluid pressure and a second valve port connected to the first chamber of the consumer. The pressure controlled valve may further comprise a valve cone slidably movable in a cavity in a valve body between a first position in which a connection between the first and second valve ports is closed by a first side of the valve cone, and a second position in which the connection between the first and second valve ports is open. The cone is being urged to its closed position by fluid pressure acting on an opposite second side of the valve cone which second side forms a space within the valve body. In addition the valve body may comprise means for passing fluid under pressure through the valve cone from the first and second valve ports to said space through passages each containing a non-return valve. Controllable valve means may be provided for connecting said space with the first and the second valve ports respectively.

The controllable valve means may comprise a first pilot valve in a conduit connecting said space with the first valve port. The first pilot valve is arranged to be actuated to allow a fluid flow from the second valve port to the first valve port, if the pressure in the first chamber exceeds that in a conduit connected to the source of fluid pressure. This is the case if, for instance, the consumer is supporting a load that is to be lowered. Pressurized fluid from the first chamber may then be drained, partially back to the second chamber and partially towards the source of fluid pressure. The source of fluid pressure may comprise at least one reversible pump, wherein fluid pressure from the first chamber is recovered by operating said pump as a motor.

The controllable valve means may also comprise a second pilot valve in a conduit connecting said space with the second valve port. The second pilot valve may be arranged to be actuated to allow a fluid flow from the first valve port to the second valve port, if the pressure delivered by the source of fluid pressure exceeds that in the first chamber. In other words, if the consumer is supporting a load that is to be raised then the first valve port is only connected to the second valve port if the pressure supplied by the source of fluid pressure exceeds that in the first chamber of the consumer. This prevents a supported load from being suddenly lowered by an inadvertent opening of the valve arrangement supplying fluid pressure.

BRIEF DESCRIPTION OF DRAWINGS

In the following text, the invention will be described in detail with reference to the attached drawings. These schematic drawings are used for illustration only and do not in any way limit the scope of the invention. In the drawings.

EMBODIMENTS OF THE INVENTION

Figure 1:
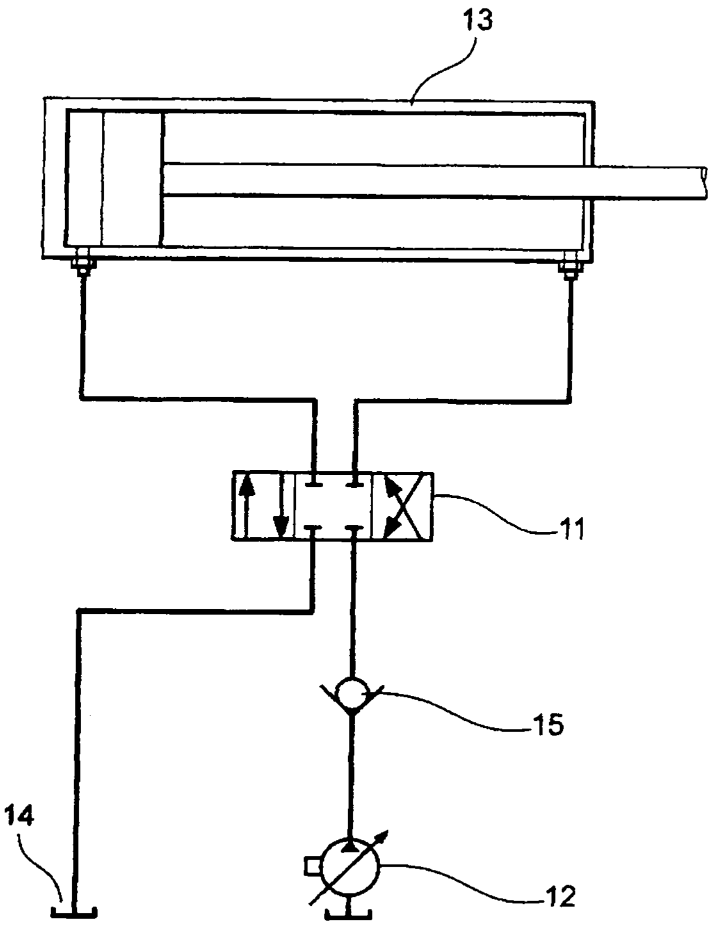
FIG. 1 shows a conventional system for controlling a cylinder using directional valves.
Figure 2:
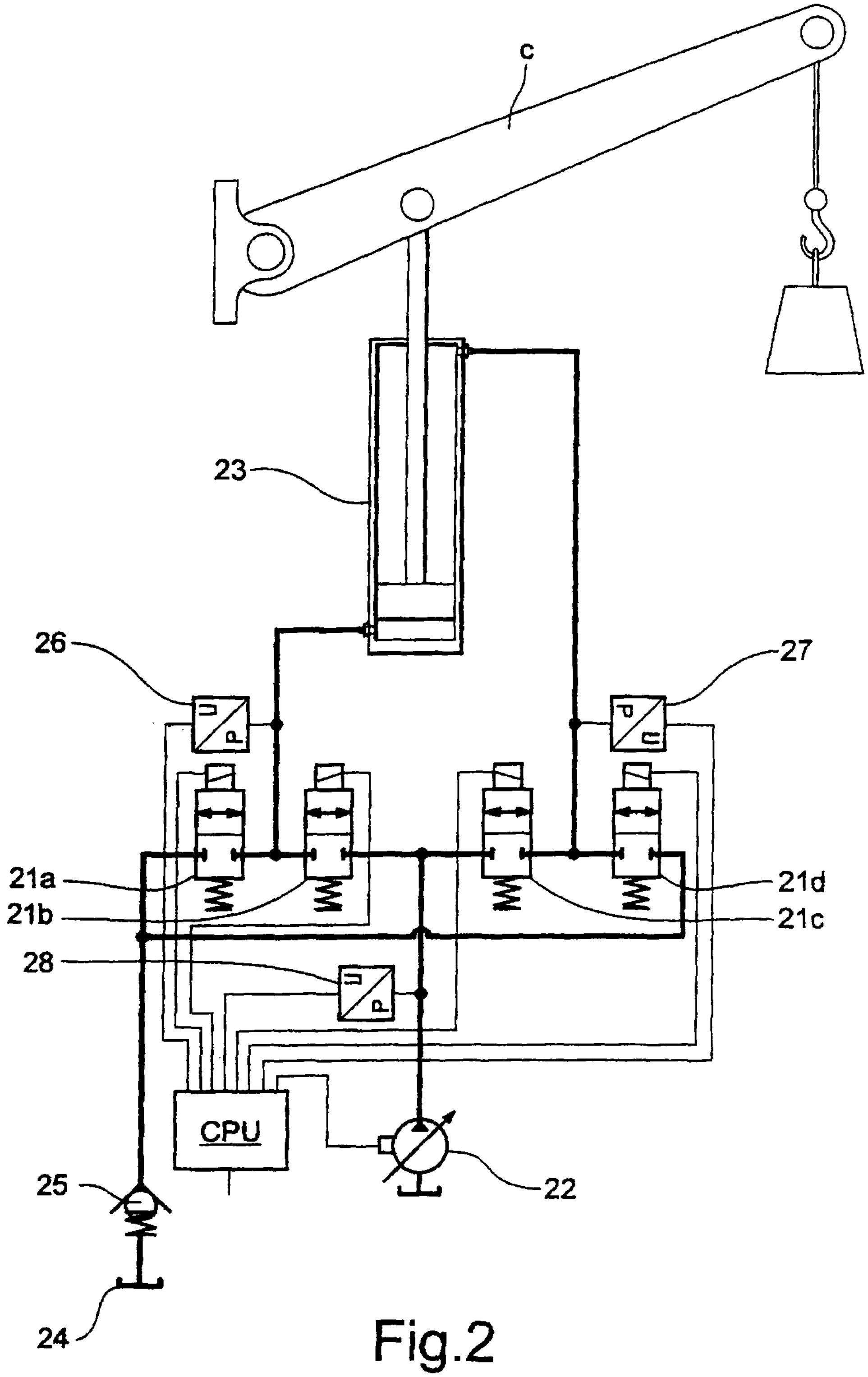
FIG. 2 shows a valve arrangement may be provided with separate cut-off valves for controlling a cylinder.
Figure 3:
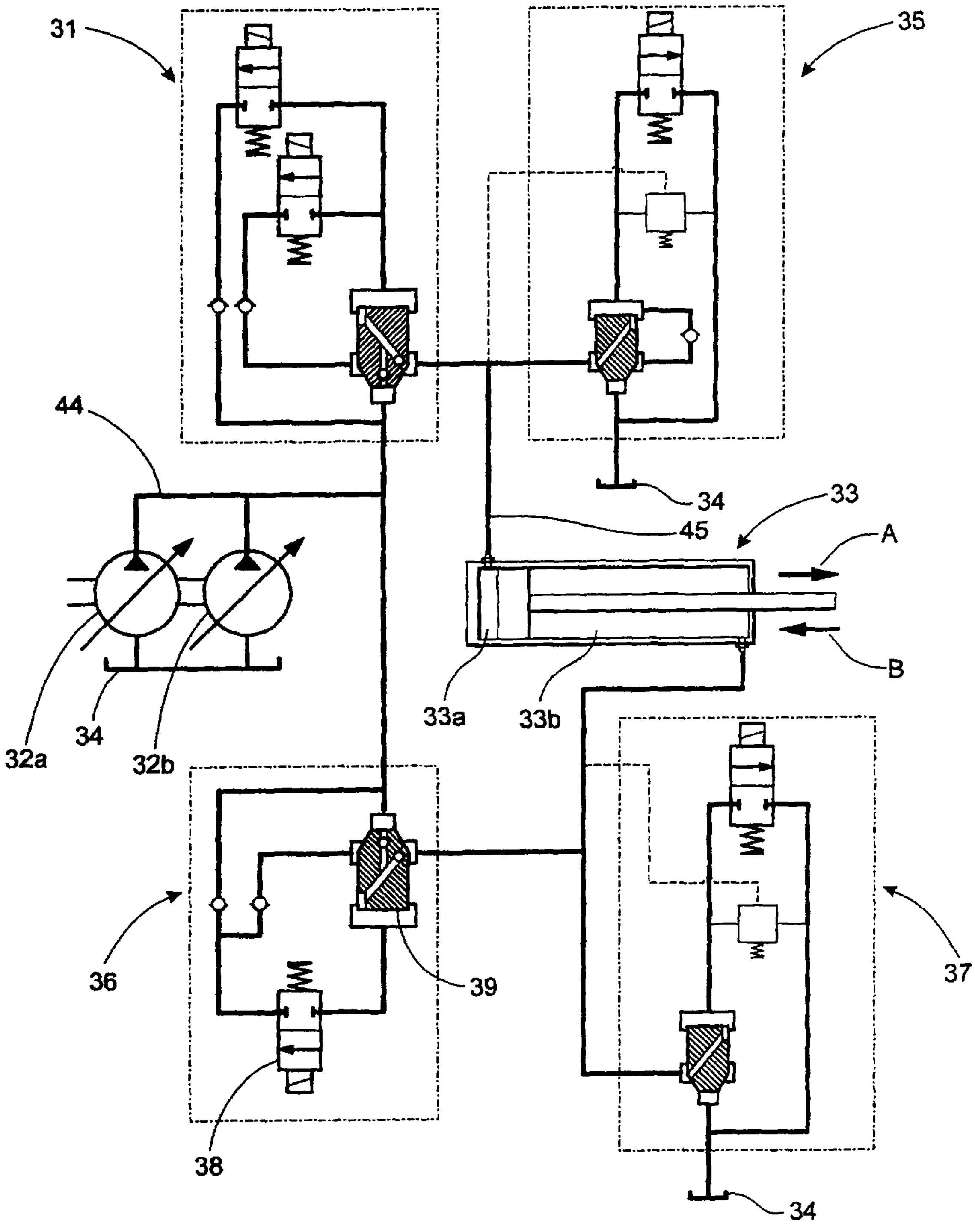
FIG. 3 shows a fluid circuit provided with a valve arrangement according to a first embodiment of the invention.

FIG. 3 shows a valve arrangement according to one embodiment of the invention. In this example a first valve arrangement 31 is used for controlling a hydraulically operated cylinder 33 and for ensuring a fail-safe operation thereof. Here, piston in the cylinder 33 performs a lifting operation in a first direction A and a lowering operation in a second direction B. This arrangement will be described in further detail in connection with FIG. 4 below. The first valve arrangement 31 is electrically actuated and is located in a conduit to supply fluid from a pair of reversible pumps 32*a*, 32*b* to a hydraulic cylinder 33. To actuate the cylinder 33, pressurized fluid is supplied via the valve arrangement 31 to a first chamber 33*a* of the cylinder, while fluid is drained from a second chamber 33*b* to a tank 34 via a valve arrangement. Although a number of tanks are indicated by the numeral "34" in FIG. 3, they are in fact the same collecting tank. A second valve arrangement 35 is connected to a conduit between the first valve arrangement 31 and the first chamber 33*a* of the cylinder 33. The second valve arrangement 35 allows fluid to be drained to the tank 34, either by means of a pressure actuated relief valve or by means of an electrically actuated 2-port valve. When either of the pressure relief valve or the electrically actuated valve is opened, a seat valve is moved to an open position to allow fluid to flow directly from the first chamber 33*a* to the tank 34. This and other electrically actuated valves described below are controlled by a central processing unit, or CPU (not shown), in response to input signals from an operator.

The relief valve is arranged to limit the pressure in the conduit with pressurized fluid at closed discharge valve when the pressure therein exceeds a predetermined value by permitting part of the flow of pressurized fluid from the cylinder 33 to drain back to the tank 34. This discharge and pressure relief unit contains valve combinations which are known per se and is not a part of the present invention and can therefore also be replaced by other combinations of valves known per se for obtaining the function required for the intended purpose.

To actuate the cylinder 33 in the opposite direction, two modes of operation is possible. In a first mode, the cylinder 33 is made to perform a lowering motion by supplying pressurized fluid via the third valve arrangement 36 to the second chamber 33*b* of the cylinder, while fluid is drained from the first chamber 33*a* to a tank 34. This operation is performed by actuating solenoid actuated 2-port valves in the second and third valve arrangements 35, 36 respectively. In a second mode, the cylinder 33 is supporting a load acting in the direction of the arrow B in FIG. 3. The cylinder 33 is made to perform a lowering motion by allowing pressurized fluid to flow from the first chamber 33*a* to the second chamber 33*b* via the third valve arrangement 36. Excess fluid not required to supplement the movement of the piston in the cylinder, is allowed to flow through one or both of the reversible pumps 32*a*, 32*b*. The pumps will then act as motors to generate fluid pressure that can be used by other consumers (not shown). In this way fluid pressure can be regenerated to save energy.

In the same way as the first valve arrangement 31 cooperates with the second valve arrangement 35, the third valve arrangement 36 is arranged to cooperate with a fourth valve arrangement 37 connected to a conduit between the third valve arrangement 36 and the second chamber 33*b* of the cylinder 33. The fourth valve arrangement 37 allows fluid to be drained to the tank 34, either by means of a pressure actuated pressure relief valve or by means of a solenoid actuated 2-port valve. When either of the pressure relief valve or the solenoid actuated valve is opened, a seat valve is moved to an open position to allow fluid to flow directly from the second chamber 33*b* to the tank 34. If the fluid pressure in either of the first or second chambers 33*a*, 33*b* of the cylinder 33 should increase above predetermined limit, discharge to the tank 34 takes place via the respective pressure relief valves in the second or fourth valve arrangements 36, 37.

Figure 4:
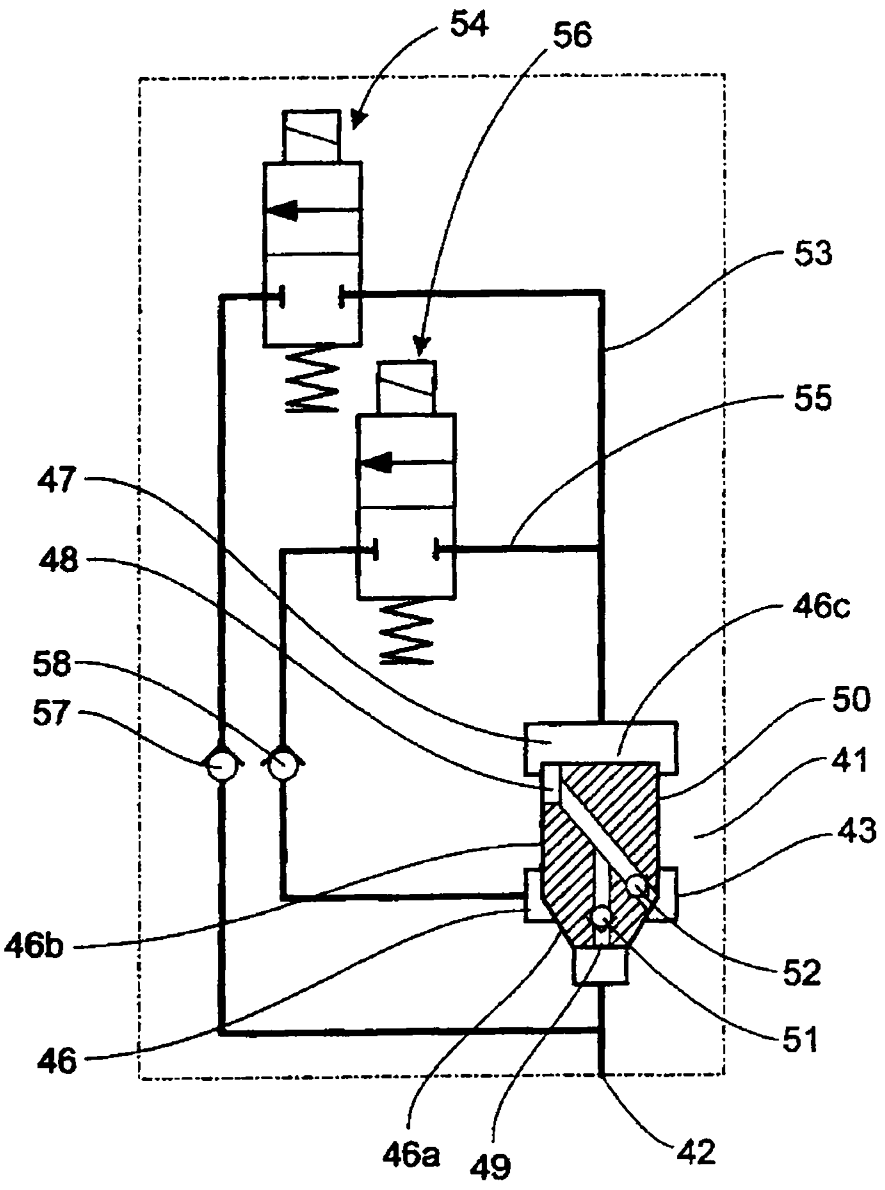
FIG. 4 shows an enlarged view of a valve arrangement shown in FIG. 3.

An enlarged view of the valve arrangement 31 is shown in FIG. 4. As seen in this figure, the pressure controlling valve comprises a valve body 41 with a first valve port 42 and a second valve port 43 which serve alternately as input and output ports. In the example shown in FIG. 4, with references to FIG. 3, the valve port 42 is connected through a conduit 44 (see FIG. 3) with a fluid pressure medium to a source of fluid pressure in the form of a pump 32*a*, 32*b*. The valve port 43 is connected through a conduit 45 for fluid pressure medium to the cylinder 33 shown in FIG. 3.

In accordance with the invention a valve cone 46 is arranged within the valve body 41 with a tight fit and movable from a closed position, as shown in FIG. 4, in which the valve cone 46 closes the two valve ports 42 and 43, and to an open position in which the valve ports 42 and 43 are connected with each other, and consequently the pump 32*a*, 32*b* is also connected with the cylinder 33 or the latter with the tank 45 for fluid pressure medium.

The valve cone 46 having a cylindrical cross-sectional form has a conical end surface 46*a* closing the valve port 42 and a cylindrical outer surface 46*b* closing the valve port 43. The end surface 46*a* has a projected area which is equal to the area of an end surface 46*c* of the valve cone 46 facing away from the pressurized fluid side and the conical end surface 46*a*. The end surface 46*c* is located in a space 47 formed as a pilot flow chamber in the valve body 41.

In the embodiment shown in FIG. 4, a groove 48 serving as a variable restriction is formed in the mantle surface of the valve cone 46, said groove 48 having a certain connection with the pilot flow chamber 47 in the closed position of the valve cone. This groove 48 is also in fluid connection the valve port 42 through a pilot flow passage 49 made in the valve cone 46, and with the valve port 43 through a pilot flow passage 50 also made in the valve cone 46, each of these passages 49, 50 being provided with a non-return valve 51 and 52, respectively, which permit pressurized fluid to flow from the valve port 42 and the valve port 43, respectively, to the groove 48 serving as a variable restriction and through this to the space 47 but prevent a flow in opposite direction.

The space 47 serving as pilot flow chamber in the valve body 41 is in turn connected with the valve ports 42 and 43. A first pilot flow passage 53 is provided between the space 47 and the first valve port 42 via the conduit 44 connected to the pump 32*a*, 32*b*. In the pilot flow passage 53 there is arranged a solenoid actuated first pilot valve 54. This valve may be an electrically operated solenoid valve, or a proportional magnet valve which is controlled steplessly between its two end positions. The first pilot valve 54 can be moved between a non-actuated closed and an actuated open position. In this example the pilot valves are a solenoid actuated 2-port valves which are spring loaded towards a closed position. In the closed position the first pilot valve 54 prevents outflow of pressurized fluid from the space 47. A second pilot flow passage 55 is provided between the space 47 and the second valve port 43. In the pilot flow passage 55 there is arranged a solenoid actuated second pilot valve 56. The second pilot valve 56 can be moved between a non-actuated closed and an actuated open position. In the closed position the second pilot valve 56 prevents outflow of pressurized fluid from the space 47.

In this way the pressure in the space 47 will be the same as in the first valve port 42 or in the second valve port 43 depending on which port has the highest pressure. More specifically, the pressure in the space 47 will be the same as the pressure upstream of the valve cone 46 as seen in the direction of flow, irrespective of which valve port 42, 43 is operated as input, as the pressure is always higher on the input side than on the output side. This pressure prevailing in the space 47 gives rise to a holding force acting on the end surface 46*c* of the valve cone 46 which is greater in dependence on the area ratio than the counter-directed pressure dependent on the port 42, 43 operating as input and acting on at least a part of the conical end surface 46*a* of the valve cone. Consequently the pressure prevailing in the space 47 holds the valve cone 46 in its closed position as long as the pilot valves 54, 56 are closed.

When, for instance, the first pilot valve 54 is opened a pilot flow will arise from the space 47 via the pilot flow passage 53, to a position downstream the valve port serving as output, i.e. the port 42 in this case. Consequently the valve cone 46 is made to move from its closed position and to open the connection through the valve body 41, and the valve cone 46 is then made to move as far from its closed position as required to establish a flow balance between the flow through the valve cone 46 and the flow through the control pilot valve 54. By the stepless control offered by said pilot valve 54 the valve cone 46 is also controlled steplessly between its end positions and a possibility is consequently obtained in this way to control the speed of the piston in the cylinder 33.

The pilot flow passages 53, 55 are each provided with a non-return valve 57 and 58, respectively, permitting a flow of fluid in a direction away from the space 47 and through the pilot valves 54, 56 in the direction of the respective port 42, 43, but not in an opposite direction. As is apparent from the drawing figures, the respective non-return valves 57 and 58 are located downstream of the pilot valves 54, 56.

In order to actuate the cylinder 33 in the direction of the arrow A against the action of a load, the pumps 32*a*, 32*b* are controlled to supply pressurized fluid. As long as the first and second pilot valve 54, 56 are maintained closed, the valve cone 46 is also kept in closed position as the pressure in the valve port 42 serving as input and in the space 47 is the same. When the second pilot valve 56 is actuated a pilot flow arises from the space 47 behind the valve cone 46 towards the second valve port 43 serving as output. Provided that the pressure in the first valve port 42 is higher than that of the second valve port 43, this pilot flow causes the valve cone 46 to move from its closed position and to open the valve. This allows pressurized fluid to flow directly from the first valve port 42 to the second valve port 43 into the first chamber 33*a* of the cylinder 33 which is then actuated to work against a load (not shown). The above arrangement provides a fail-safe function that prevents the valve arrangement 31 from opening unless the pressure supplied from the pumps 32*a*, 32*b* is higher than the pressure in the first chamber 33*a* of the cylinder 33.

In order to actuate the cylinder 33 in the direction of the arrow B, two modes of operation are possible. In a first mode the pumps 32*a*, 32*b* are used for regenerating pressurized fluid from the first chamber 33*a* of the cylinder 33. As long as the first and second pilot valve 54, 56 are maintained closed, the valve cone 46 is also kept in closed position as the pressure in the valve port 42 serving as input and in the space 47 is the same. When the first pilot valve 54 is actuated a pilot flow arises from the space 47 behind the valve cone 46 towards the first valve port 42 serving as output. Provided that the pressure in the second valve port 43 is higher than that of the first valve port 42, this pilot flow causes the valve cone 46 to move from its closed position and to open the valve. This allows pressurized fluid to flow directly from the first chamber 33*a* of the cylinder 33 through the second valve port 43 to the first valve port 42. From the first valve port 42, a first volume of the pressurized fluid flow through the actuated, opened third valve arrangement 36 to fill the second chamber 33*b* of the cylinder 33 as the piston moves in the direction of the arrow B. A second volume of the pressurized fluid flows through the conduit 44 to the pumps 32*a*, 32*b*, which are driven as motors to recover energy or fluid pressure.

In a second mode the pumps 32*a*, 32*b* are controlled to supply pressurized fluid to actuate the cylinder 33 in the direction of the arrow B. In the first valve arrangement 31, the first and second pilot valve 54, 56 are maintained closed and the valve cone 46 is also kept in closed position as the pressure in the valve port 42 serving as input and in the space 47 is the same. In the valve arrangement 36, a solenoid valve 38 (see FIG. 3) is actuated to provide a pilot flow that causes a valve cone 39 to move from a closed position and to an open and allow flow from the pumps 32*a*, 32*b* to the second chamber 33*b* of the cylinder 33. Provided the input port pressure, supplied from the pumps 32*a*, 32*b*, is higher than the output port pressure, in the second chamber 33*b*, the valve cone 39 will open. This allows pressurized fluid to flow directly from the input port to the output port of the valve arrangement 36 into the first chamber 33*a* of the cylinder 33. At the same time the second valve arrangement 35 is actuated to allow fluid to be drained to the tank 34. This is achieved by means of a solenoid actuated 2-port valve. When the solenoid actuated valve is opened, a seat valve is moved to an open position to allow fluid to flow directly from the first chamber 33*a* to the tank 34.

In the example shown in FIG. 3, a valve arrangement 31 according to the invention is used to provide a fail-safe actuation of the cylinder 33 in case the pressure in the output port is higher than that of the input port. For a double acting valve it is also possible to replace the third valve arrangement 36 by the first valve arrangement 31 to provide a fail-safe actuation of the cylinder 33 in both directions.

The invention is not limited to the above embodiments, but may be varied freely within the scope of the appended claims.

The invention claimed is:

1. Valve arrangement for controlling a fluid consumer, which valve arrangement is arranged for selectively connecting a source of fluid pressure to the consumer in order to actuate the consumer in a predetermined direction, the valve arrangement comprising:

a pressure controlled valve comprising a first valve port connected to the source of fluid pressure, a second valve port connected to a first chamber of the consumer, a valve cone slidably movable in a cavity in a valve body between a first position in which a connection between the first and second valve ports is closed by a first side of the valve cone, and a second position in which the connection between the first and second valve ports is open, said cone being urged to its closed position by fluid pressure acting on an opposite second side of the valve cone which second side forms a space with the valve body, means for passing fluid under pressure through the valve cone from the first and second valve ports to said space through passages each containing a non-return valve, and controllable valve means comprising a first pilot valve in a conduit connecting said space with the first valve port and a second pilot valve in a conduit connecting said space with the second valve port, which controllable valve means prevents the valve cone from opening if the pressure in one of the first and second valve ports intended to be an input port is lower than the pressure in the other of the first and second valve ports intended to be an output port.

2. Valve arrangement according to claim 1, wherein the first pilot valve is arranged to be actuated to allow a fluid flow from the second valve port to the first valve port, if the pressure in the second valve port exceeds that of the first valve port.

3. Valve arrangement according to claim 1, wherein the second pilot valve is arranged to be actuated to allow a fluid flow from the first valve port to the second valve port, if the pressure in the first valve port exceeds that of the second valve port.

4. Valve arrangement according to claim 1, further including a non-return valve in the conduit connecting the space with the first valve port and a non-return valve in the conduit connecting the space with the second valve port.

5. A fluid circuit comprising:

a controllable source of fluid pressure;

a fluid consumer having a first and a second chamber for fluid, wherein the consumer is arranged to be movable between a first and a second end position under the action of said fluid; and a plurality of valve arrangements for selectively connecting the source of fluid pressure to the first or the second chamber of the consumer, in order to allow fluid to be supplied to or drained from the respective chamber, wherein at least one of the plurality of valve arrangements for selectively connecting the source of fluid pressure to a first chamber of the consumer comprises a first valve port connected to the source of fluid pressure, a second valve port connected to the first chamber of the consumer, a valve cone slidably movable in a cavity in a valve body between a first position in which a connection between the first and second valve ports is closed by a first side of the valve cone, and a second position in which the connection between the first and second valve ports is open, said cone being urged to its closed position by fluid pressure acting on an opposite second side of the valve cone which second side forms a space with the valve body; means for passing fluid under pressure through the valve cone from the first and second valve ports to said space through passages each containing a non-return valve, and controllable valve means comprising a first pilot valve in a conduit connecting said space with the first valve port and a second pilot valve in a conduit connecting said space with the second valve port.

6. The fluid circuit according to claim 5, wherein the first pilot valve is arranged to be actuated to allow a fluid flow from the second valve port to the first valve port if the pressure in the first chamber exceeds that in a conduit connected to the source of fluid pressure.

7. The fluid circuit according to claim 5, wherein the source of fluid pressure comprises at least one reversible pump, wherein fluid pressure is recovered by operating said pump as a motor.

8. The fluid circuit according to claim 5, wherein the second pilot valve is arranged to be actuated to allow a fluid flow from the first valve port to the second valve port, if the pressure delivered by the source of fluid pressure exceeds that in the first chamber.

9. The fluid circuit according to claim 5, further including a non-return valve in the conduit connecting the space with the first valve port and a non-return valve in the conduit connecting the space with the second valve port.

* * * * *